United States Patent
Brundridge

(10) Patent No.: US 7,721,122 B2
(45) Date of Patent: May 18, 2010

(54) POWER DISTRIBUTION SYSTEM INCLUDING A CONTROL MODULE AND A METHOD OF USING THE SYSTEM

(75) Inventor: Michael A. Brundridge, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 684 days.

(21) Appl. No.: 11/621,366

(22) Filed: Jan. 9, 2007

(65) Prior Publication Data

US 2008/0168282 A1 Jul. 10, 2008

(51) Int. Cl.
 *G06F 1/26* (2006.01)
(52) U.S. Cl. ...................................... 713/300
(58) Field of Classification Search ............ 713/1, 713/300; 714/14
 See application file for complete search history.

(56) References Cited

U.S. PATENT DOCUMENTS

| | | | |
|---|---|---|---|
| 4,495,568 A | 1/1985 | Gilbert et al. | |
| 5,949,974 A | 9/1999 | Ewing et al. | |
| 6,144,998 A | 11/2000 | Pisterzi | |
| 2006/0044117 A1* | 3/2006 | Farkas et al. | 340/310.11 |
| 2007/0138867 A1* | 6/2007 | Choi et al. | 307/3 |
| 2008/0141070 A1* | 6/2008 | Egan et al. | 714/24 |

FOREIGN PATENT DOCUMENTS

| | | | |
|---|---|---|---|
| JP | 07-284236 A | 10/1995 | |
| JP | 2005-033923 A | 2/2005 | |

OTHER PUBLICATIONS

Combined Search and Examination Report from the UK Intellectual Property Office for GB0800276.8 dated May 14, 2008, 5 pgs.

* cited by examiner

*Primary Examiner*—Chun Cao
(74) *Attorney, Agent, or Firm*—Larson Newman & Abel, LLP

(57) ABSTRACT

A method of employing a power supply grid can include transmitting an identification initiation command from a control module to a first power supply unit to initiate a corresponding identification command. The method can also include transmitting an identification command from the first power supply unit to other power supply unit(s) that are supplied with power using a power supply phase in common with the first power supply. The method can further include transmitting identification acknowledgement signal(s) from the other power supply unit(s) to the control module in response to the first corresponding identification command. In one embodiment, the method can include mapping which power supply units correspond to various power supply grids. In other embodiments, control modules and power distribution systems can be operable to perform portions of the methods.

18 Claims, 3 Drawing Sheets

POWER DISTRIBUTION SYSTEM INCLUDING A CONTROL MODULE AND A METHOD OF USING THE SYSTEM

FIELD OF THE DISCLOSURE

This disclosure relates generally to power distribution systems, and more particularly to power distribution systems including control modules and methods of using the systems.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system can include a set of blade servers that can be located within a chassis. Power supplies for the blade servers can include 3-phase power supplies that are loaded from the front of the chassis. The 3-phase power supplies require the correct connections between the three incoming power supply phases from a power supply panel and the corresponding terminals of the power supplies, via a connection module. Incorrectly wired power supplies will not work, and therefore, the power supplies need to be correctly wired to have the power supplies operational. For example, if the chassis is connected to two different power supply panels, the three power supplies associated with each power supply panel will be known because of the wiring requirements for the 3-phase power supplies.

Alternatively, the 3-phase power supplies can be replaced by single phase power supplies, which are less expensive than 3-phase power supplies. Incoming power from a power supply panel may be in the form of the three incoming power supply phases as described with respect to the 3-phase power supplies. Unlike the 3-phase power supplies, the single phase power supplies are only connected to two of the incoming power supply phases. For example, if the incoming power supply phases include phase A, phase B, and phase C, one of the power supplies can be connected to phases A and B, another of the power supplies can be connected to phases A and C, and yet another of the power supplies can be connected to phases B and C.

A power supply grid for the chassis can include N+1 power supplies for power supply redundancy. The power supply redundancy ensures that at least one more than the minimum number of power supplies needed to operate the blade servers is operating. The power supply grid for the chassis can also include N+N redundancy for power supply panel redundancy. This means that each power supply connected to a power supply panel has a corresponding power supply connected to a different power supply panel, and thus the number of power supplies connected to a pair of power supply panels are the same.

A problem arises as the number of incoming power supplies increases, particularly in view of needed or desired redundancies. The second set of incoming power supply phases can also include three phases. The mapping of the various single phase power supplies to the corresponding sets of incoming power supply phases is used for maintenance, power up/down down, faults or other undesired conditions, or the like. A manual mapping is prone to error. Terminating incoming power from a set of incoming power phases to determining the mapping may not be an acceptable alternative for an information handling system that is currently operating.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are shown and described with respect to the drawings presented herein.

The use of the same reference symbols in different figures indicates similar or identical items.

DETAILED DESCRIPTION

Figure 1:
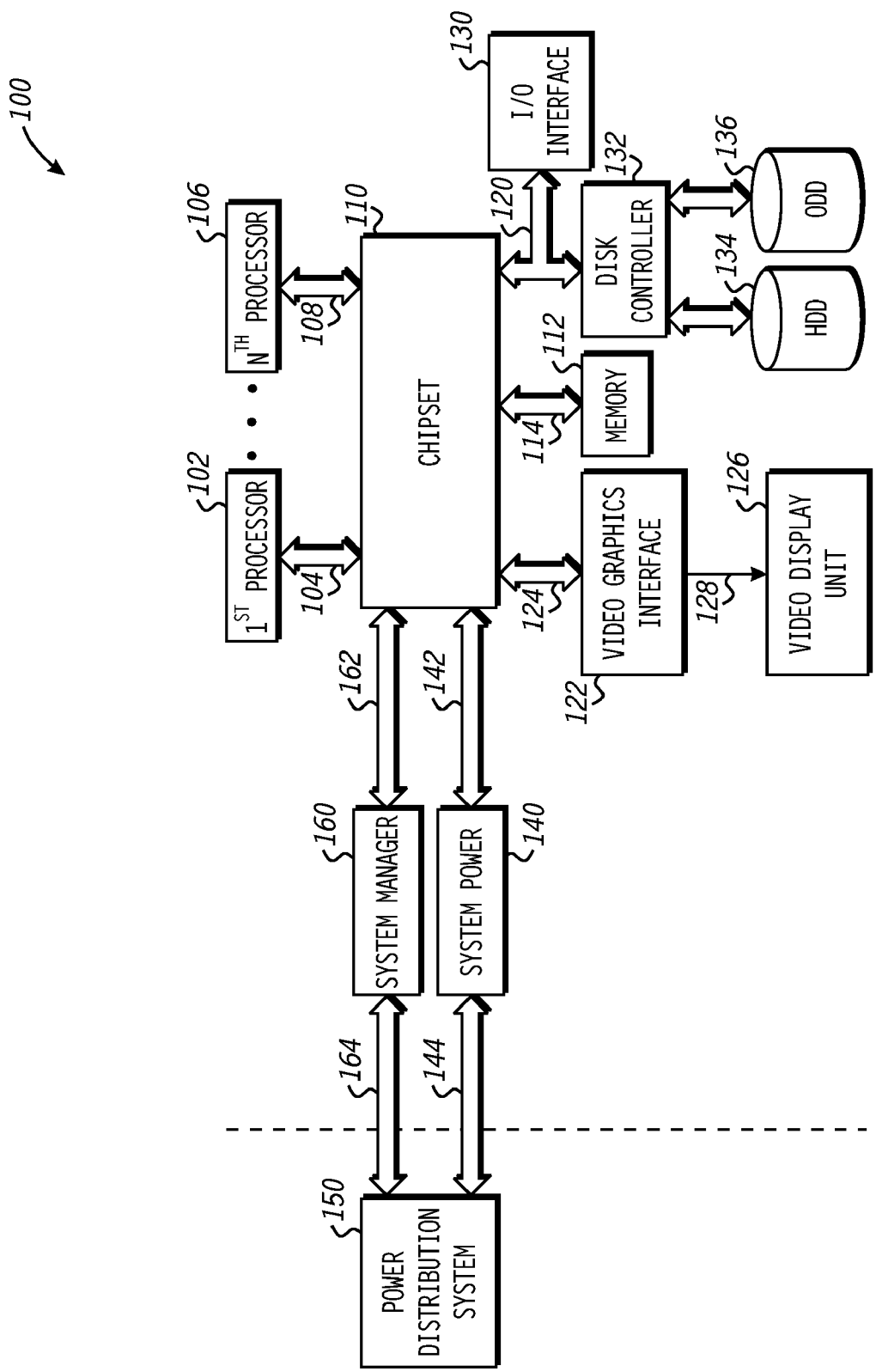
FIG. 1 includes a functional block diagram of an information handling system including a power distribution system.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC)), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

According to an aspect, a method of employing a power supply grid can include transmitting a first identification initiation command from a control module that is received by a first power supply unit to initiate a first corresponding identification command, wherein the first power supply unit has a first power supply unit identifier. The method can also include transmitting the first corresponding identification command from the first power supply unit that is received by a second power supply unit, wherein the first corresponding identification command is carried by a first power supply phase. The method can further include transmitting a first identification acknowledgement signal from the second power supply unit that is received by the control module in response to the first corresponding identification command, wherein the first identification acknowledgement signal includes a second power unit identifier for the second power supply unit.

According to another aspect, a control module can include a grid processor and a communication module. The grid processor can be operable to initiate an identification process using a particular phase of three available phases present within a power grid, and process power supply unit identifiers received over the particular phase of the three available phases. The communication module can be operable to transmit an identification initiation command to a first power supply unit for the first power supply unit to transmit a first corresponding identification command that is to be carried by a first power supply phase. The communication module can be further operable to receive a first identification acknowledgement signal from a second power supply unit, wherein the first identification acknowledgement signal includes a second power supply unit identifier.

According to a further aspect, a power distribution system can include a control module including a first communication module and a first power supply unit coupled to the control module. The first power supply unit can include a second communication module operable to receive a first command transmitted by the control module, and transmit a corresponding identification command carried by a power supply phase. The power distribution system can further include a second power supply unit coupled to the control module. The second power supply unit can include a third communication module operable to receive the corresponding identification command from the first power supply unit, and transmit an identification acknowledgement signal to the control module in response to receiving the corresponding identification command.

FIG. 1 illustrates a functional block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an I/O controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a third host bus 114. In a particular embodiment, the host buses 104, 108, and 114 can be individual buses or part of the same bus. The chipset 110 can also provide bus control and can handle transfers between the host buses 104, 108, and 114.

According to another aspect, the chipset 110 can be generally considered an application specific chipset that provides connectivity to various buses, and integrates other system functions. For example, the chipset 110 can be provided using an Intel® brand Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an ASIC.

In the description below, a physical description of hardware, firmware, or software embodiments is described with respect to FIGS. 1 to 4. Much of the physical description will include couplings, connections, and some functionality description. A method description is described with respect to FIGS. 5 and 6, with references to the components of described in FIGS. 1 to 4.

The information handling system 100 can also include a video graphics interface 122 that can be coupled to the chipset 110 using fourth host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O bus 120 and the I/O interface 130 can include industry standard buses or proprietary buses and respective interfaces or controllers. The I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O host bus 120 including other industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the fourth bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include system power 140 that can be coupled to the chipset 110 via power plane 142. Although not illustrated, other components, such as the processors (1st processor 102 through the $n^{th}$ processor 106), the video display unit 126, the video graphic interface 122, the memory 112, and the disk controller 132 can be coupled to the system power 140. Commands, communications, or other signals may be sent to or received from the system power 140 by any one or combination of components previously described. The system power 140 can be in the form of a power sub-system within the information handling system 100. The system power 140 can also be coupled to a power distribution system 150 via power cables 144. As illustrated in FIG. 1, power can be transmitted from the power distribution system 150 to system power 140.

The system power 140 can be part of a larger power grid that can be provided internal, external, or remote to the information handling system 100. In one form, the system power 140 can be part of a chassis operation to provide power to multiple systems, components, or any combination thereof. In another form, a redundant system power may also be provided. System power can also be realized through the use of multiple power supply units and need not be limited to a single power source.

The information handling system 100 can further include system manager 160 that can be coupled to the chipset 110 via a first communication bus 162, such as a control bus. Although not illustrated, other components, such as the processors (1st processor 102 through the n$^{th}$ processor 106), the video display unit 126, the video graphic interface 122, the memory 112, and the disk controller 132 can be coupled to the system manager 160. Commands, communications, or other signals may be sent to or received from the system manager 160 by any one or combination of components previously described. The system manager 160 can be in the form of a power sub-system within the information handling system 100. The system manager 160 can also be coupled to the power distribution system 150 via a second communication bus 164. The first and second communication buses 162 and 164 can be an I$^2$C bus, a System Manager (SM) bus, another suitable communication medium, or any combination thereof.

In one particular embodiment, all components and sub-systems to the right of the dashed line can be attached to or part of a blade. The power distribution system 150 can be attached to a chassis, rack, enclosure, or any combination thereof. The blade can be attached to the chassis. Other implementations can be used. After reading this specification, skilled artisans will appreciate that the information handling system and its power source(s) can be configured to their particular needs or desires.

Figure 2:
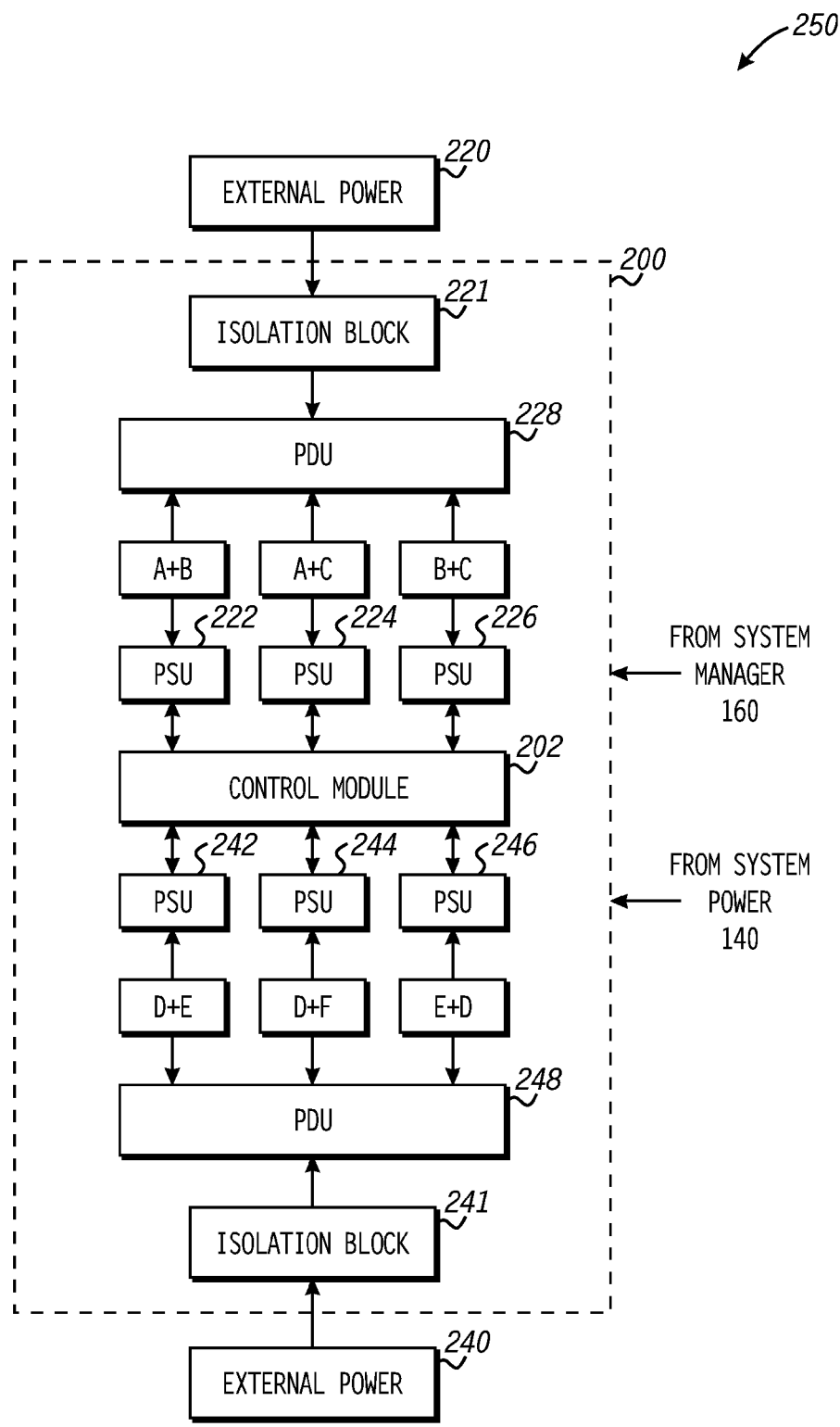
FIG. 2 includes a functional block diagram of a power distribution system that can be used in the information handling system of FIG. 1.

FIG. 2 includes a functional block of a power distribution system 250. In one embodiment, the power distribution system 250 can be the power distribution system 150 that provides power to the system power 140, as illustrated in FIG. 1. The power distribution system 250 can include a chassis 200 (dashed line) coupled to external power 220 and 240. The external power 220 and 240 can come from different power panels at a facility in which the power distribution system 250 is location. The external power 220 and 240 can be independent of one another, such as if the external power 220 or 240 is not operational, the other external power continues to operate. In a particular embodiment, each external power 220 and 240 can provide 3-phase power to the power distribution system 250. The phases for external power 220 can include phases A, B, and C, and the phases for external power 240 can also include phases A, B, and C, generally illustrated as phases D, E, and F. The nominal voltage for the external powers 220 and 240 can be 120 V, 240 V, 480 V, or another suitable voltage. The frequency of the external powers 220 and 240 can be 50 hz, 60 hz, or another suitable frequency. The external powers 220 and 240 may be substantially identical or different to each other with respect to the foregoing or other characteristics. After reading this specification, skilled artisans will appreciate that parameters other than those described herein. Thus, the values are merely illustrative and do not limit the scope of the present invention.

The external powers 220 and 240 are coupled to isolation blocks 221 and 241, respectively. The isolation blocks 221 and 241 help to reduce relatively radio-frequency signals or other high frequency or low frequency noise, that are carried by the different phases within the power distribution system 250 from being transmitted to the external powers 220 and 240. Each of the isolation blocks 221 and 241 can include a capacitive element, another component, another configuration or any combination thereof that can remove substantially all of the communication signals that will be routed through power distribution units 228 and 248 before reaching the external powers 220 and 240. Simply put, power can enter the power distribution system 250, but communications within the power distribution system 250 cannot be transmitted from the power distribution system 250 to the external powers 220 and 240.

The external powers 220 and 240 are also coupled to power distribution units (PDUs) 228 and 248, respectively. In a particular embodiment, the 3-phases of the power from the external power are separated into different terminal connections within each of the PDUs 228 and 248. In the illustrated embodiment, the PDU 228 is coupled to power supply units (PSUs) 222, 224, and 226, and the PDU 248 is coupled to PSUs 242, 244, and 246. The coupling may be accomplished using a universal power bus and a general I/O interface. Clearly, another type of power bus, another type of interface, or any combination thereof may be used. In a particular embodiment, each of the PSUs 222, 224, 226, 242, 244, and 246 is a single phase power supply unit. In another particular embodiment, any of the PSUs, or combination of PSUs, could be replaced by a 3-phase power supply unit.

When the PSUs are single phase PSUs, each of the PSUs 222, 224, 226, 242, 244, and 246 includes a pair of power supply lines that are coupled to different combinations of phases from its respective PDU. For example, the PSU 222 can be coupled to the A and B phases of the external power 220 via the PDU 228. Similarly, the PSU 224 can be coupled to the A and C phases, and the PSU 226 can be coupled to the B and C phases. The PSU 242 can be coupled to the D and E phases of the external power 240 via the PDU 248. Similarly, the PSU 244 can be coupled to the D and F phases, and the PSU 246 is coupled to the E and F phases. The phase designations are generally illustrated in FIG. 2, however, in other embodiments, different phases can be used. In one form, the A, B, and C phase can be equivalent to the D, E, and F phases, respectively. In another form, the A and D phases may be at the same or different phase angle, the phases B and E phases may be at the same or different phase angle, and the C and F phases may be at the same or different phase angle. In still another embodiment, more or fewer PSUs may be coupled to each or all of the PDUs. In the illustrated embodiment, a power grid includes the PDU 228 and PSUs 222, 224, and 226.

In a particular embodiment, the power distribution system 250 or its corresponding information handling system(s) can have N+N power grid redundancy and N+1 PSU redundancy policies. The N+N power grid redundancy can allow for two separate external power supply sources that power the same number of PSUs for each external power supply source. In other words, each complementary pair of power grids has the same number of PSUs. For example, another power grid can include the PDU 248 and PSUs 242, 244, and 246 and provide the proper redundancy for other power grid. The N+1 PSU redundancy policy can allow for an additional PSU beyond what is currently needed to be available for use. Thus, when the N+N and N+1 redundancy policies are used, the power distribution system 250 can have at least 4 PSUs. If the policies are not used, the power distribution system 100 can still be used for less than 4 PSUs. More than two external power sources can be used, and the external power sources can provide alternating current or direct current.

In the illustrated embodiment, the power distribution system 250 further includes a control module 202, which can be at least a part of as a chassis management controller, a baseboard management controller, an integrated management controller, a service processor, or any combination thereof. The control module 202 can be coupled to the PSUs 222, 224, 226, 242, 244, and 246. In a particular embodiment, the control module 202 may be part of a microprocessor or a set of microprocessors used in operating the power distribution system 250. The control module 202 and the PSUs can be coupled to the PSUs via an $I^2C$ bus, an SM bus, another suitable communication medium control bus, or any combination thereof.

In one embodiment, the power distribution system 250 can be coupled to the system manager 160, system power 140, or any combination thereof. The system manager may be coupled to the control module 202, processor(s) within PSU (s), or any combination thereof. Any single PSU or combination of PSU(s) can provide power to the system power 140.

Figure 3:
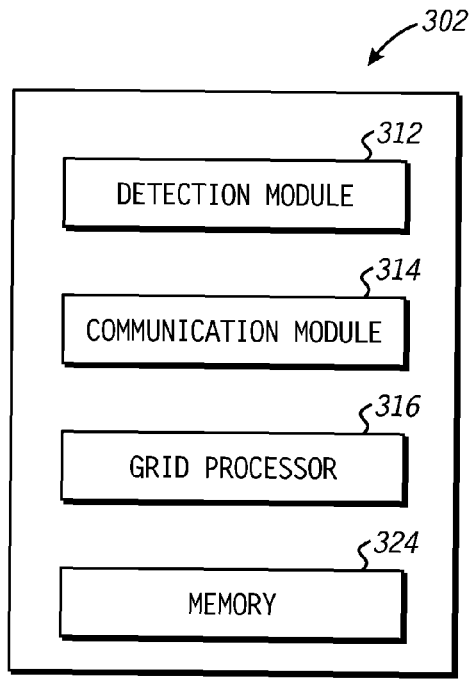
FIG. 3 includes a functional block diagram of a control module that can be used in the power distribution system of FIG. 2.

FIG. 3 includes a functional block diagram of a control module 302 that can be used for control module 202. Connections and couplings to other parts of the power distribution system are not illustrated in FIG. 3 to simplify understanding of the control module 302. The control module 302 includes a detection module 312, a communication module 314, a grid processor 316, and a memory 324. The detection module 312 can be operable to detect PSUs (not illustrated in FIG. 3) that are coupled to the control module 302. The detection module 312 may obtain a PSU identifier from the PSU or assign a PSU identifier to each PSU that does not have or provide a PSU identifier to the detection module 312. The communication module 314 can be operable to transmit signals from the control module 302 to the PSUs, and to receive signals from the PSUs for the control module 302. The communication module 314 can also be operable to transmit signals from the control module 302 to a system manager (e.g., the system manager 160), and to receive signals from the system manager for the control module 302.

The grid processor 316 can be operable to initiate identification processes using particular phases of three available phases present within a power grid. The grid processor 316 can also be operable to process data or other information, process PSU identifiers received over the particular phases of the three available phases, received from the PSUs. The grid process can further be operable to process data or other information from received from the system manager, the memory 324, or both. The grid processor 36 is still further operable to the grid processor is further operable to map which PSUs are associated with a power grid in response to communications sent or received by the communication module 314. For example, the grid processor 316 can be operable to determine which PSU(s) are associated with their corresponding power grids. The memory 324 can be operable to hold data or other information on a temporary or persistent basis. In one embodiment, the memory 324 can include a buffer to receive information from the PSU(s), the system manager, or any combination thereof. In another embodiment, the memory 324 can include data or other information, such as instructions, that can be used by the grid processor 316. In still another embodiment, the memory 324 can include different portions that serve different functions.

Figure 4:
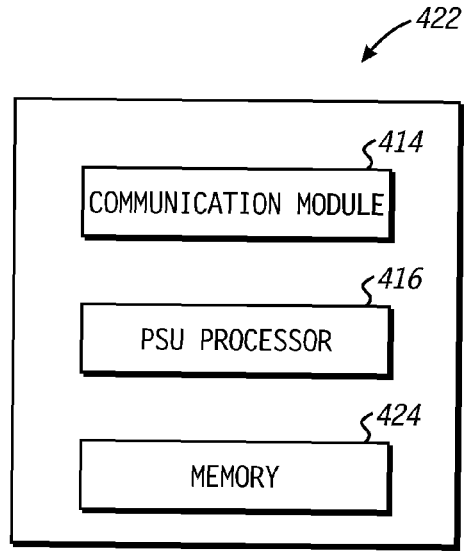
FIG. 4 includes a functional block diagram of a power supply unit that can be used in the power distribution system of FIG. 2.

FIG. 4 includes a functional block diagram of a PSU 422 that can be used for any or all of the PSUs described herein. The communication module 414 can be operable to transmit signals from the PSU 422 to the control module (e.g., control module 202), and to receive signals from the control module for the PSU 422. The communication module 414 can also be operable to transmit signals from the PSU 422 to a system manager (e.g., the system manager 160), and to receive signals from the system manager for the PSU 422. The PSU processor 416 can be operable to process data or other information received from the control module, the system manager, memory 424, or any combination thereof. For example, the PSU processor 416 can be operable to execute instructions used in carrying out the methods described in more detail later in this specification. The PSU processor 416 can be further operable to determine how much power from PSU 422 is to be provided to the system power (e.g., the system power 422). The memory 424 can be operable to hold data or other information on a temporary or persistent basis. In one embodiment, the memory 424 can include a buffer to receive information from the control module, the system manager, or any combination thereof. In another embodiment, the memory 424 can include data or other information, such as instructions, that can be used by the PSU processor 416. In still another embodiment, the memory 424 can include different portions that serve different functions.

With respect to the control module 302, the PSU 422, or both, signals, whether transmitted or received, can be as simple as a single signal (e.g., a single bit of datum) or as a collection of signals in a form of a byte, a word, a more complex communication, or other information. In other embodiment, more, fewer, or different modules may be used. The functions of one module may be combined with functions of another module or may be split between different modules. For example, within the control module 302, the PSU 422, or both, the communication module could include one communication module operable to transmit signals and another communication module to receive modules. More than one communication module may be used for different buses or interfaces. For example, the communication module 434 within the PSU 422 may include one communication module operable to communicate with a control module, and another communication module to communicate with other PSUs. The grid processor 316 may be part of a larger module that monitors or controls the power grids over which the control module 302 is to control. The modules can include logic that is in hardware, firmware, software, or any combination thereof.

Figure 5:
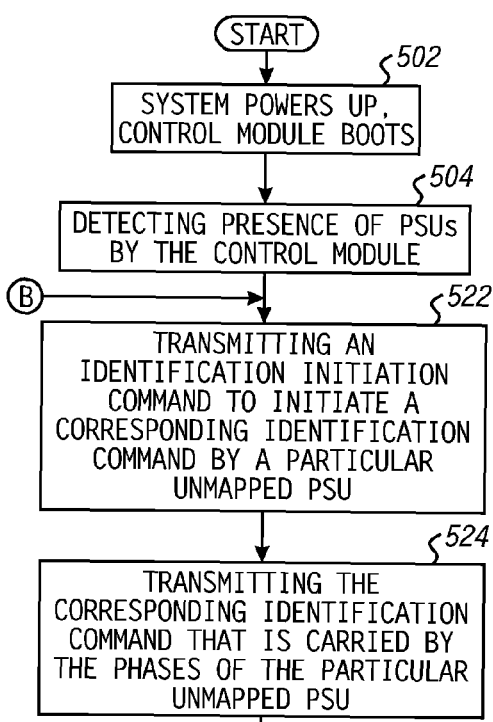
FIGS. 5 and 6 include a flow diagram of a method of mapping power supply units to different power grids within the power distribution system.
Figure 6:
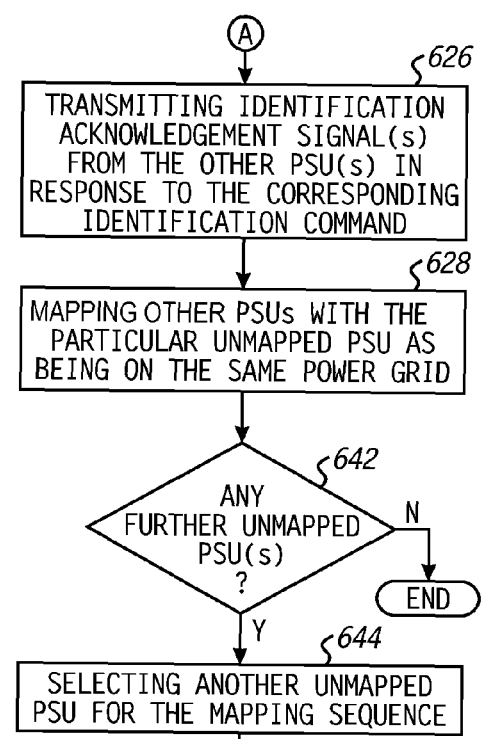

FIGS. 5 and 6 illustrate a flow diagram of a method of using a power distribution system (e.g., the power distribution system 250) that can be used with one or more information handling systems (e.g., the information handling system 100). The method can be employed in whole or in part by the power distribution system 250 illustrated in FIG. 2, the information handling system 100 depicted in FIG. 1, or any other type of information handling or power distribution system operable to employ the method, as illustrated in FIGS. 5 and 6. Additionally, the method can be embodied in various types of encoded logic including software, firmware, hardware, or other forms of digital storage mediums or logic, or any combination thereof, operable to provide all or portions of the method of FIGS. 5 and 6. While much of the method as illustrated in FIGS. 5 and 6 is described with respect to FIG. 2, after reading this specification, skilled artisans will appreciate that many other configurations may be used. Thus, the figures, such as FIGS. 2, 5, and 6, are to aid in the understanding of particular embodiments, and do not limit the scope of the present invention.

The information handling system powers up and the control module boots, at block 502 in FIG. 5. The method can include detecting the presence of PSUs by the control module at block 504. In one embodiment, a detection module within the control module detects the PSUs. Referring to FIG. 2, the detection module within the control module 202 would detect PSUs 222, 224, 226, 242, 244, and 246. Identifiers for the PSUs can be sent to or otherwise obtained by the control module 202 at this time, or may be sent to or obtained by the control module 202 at a later time. However, at this point in the process, the control module 202 may not know which PSUs are available to be coupled to which power grids.

In one embodiment, the control module 202 can have or obtain information from a configuration file that has information regarding the detected PSUs. The configuration file can include which PSU occupies which slot or other position within the power distribution system. In a particular embodiment, the first selected PSU that receives the first identification initiation command may be the PSU that occupies the first slot or lowest slot within the power distribution system, and the next selected PSU that receives the next identification initiation command may be the PSU that occupies next unmapped slot or then-current lowest slot within the power distribution system. In still another embodiment, the order may be reverse (e.g., start with the PSU that occupies last slot or highest slot within the power distribution system), or randomly selected from unmapped PSUs.

The method can also include transmitting an identification initiation command to initiate a corresponding identification command by a particular unmapped PSU, at block 522. Referring to FIG. 2, the control module 202 can transmit the identification initiation command to the PSU 222 to initiate the corresponding identification command. In another embodiment, a different PSU could be chosen. In a particular embodiment, the communication module of the control module 202 and the communication module of the PSU 222 can be used.

The method can further include transmitting the corresponding identification command that is carried by the phases of the particular unmapped PSU, at block 524. Referring to FIG. 2, in response to receiving the identification initiation command from the control module 202 to initiate the corresponding identification command, the PSU 222 can transmit the corresponding identification command that is carried by the phases coupled to the PSU 222, and more particularly, carried by Phase A and Phase B. The corresponding identification command carried by Phase A can be routed through the PDU 228 to the PSU 224, and the corresponding identification command carried by Phase B can be routed through the PDU 228 to the PSU 226. In a particular embodiment, the communication module of the PSU 222 can send the corresponding identification command, and the communication modules of the PSUs 224 and 226 can receive the corresponding identification command.

The method can still further include transmitting identification acknowledgement signal(s) from the other PSU(s) in response to the corresponding identification command, at block 626 in FIG. 6. Referring to FIG. 2, after receiving the corresponding identification command from the PSU 222, the PSUs 224 and 226 can transmit identification acknowledgement signals to the control module 202. In a particular embodiment, the communication modules of the PSUs 224 and 226 can send the identification acknowledgement signals, and the reception module of the control module 202 can receive the identification acknowledgement signals. The method can yet further include mapping the other PSUs with the particular unmapped PSU as being on the same power grid, at block 628. The control module 202 transmitted the identification initiation command to PSU 222 and received identification acknowledgement signals from PSUs 224 and 226. In a particular embodiment, the grid processor of the control module 202 determines that the PSUs 222, 224, and 226 are on the same power grid.

The particular protocol of the commands, signals, or any combination thereof is not critical. The protocols of the commands, signals, or any combination thereof can be universal power bus (UPB) signals, X10 signals, broadband over power line signals, consumer electronic bus (CEBUS) signals, other suitable communication protocol, or any combination thereof. More specifically, any protocol that can be used to transmit commands, signals, or any combination thereof between a selected PSU and other PSUs can be used. The protocol that can be used to transmit commands, signals, or any combination thereof between the control module and the PSUs coupled to the control module can used the any of the foregoing protocols or other protocols commonly used between or within information handling systems. The same protocol or different protocols can be used for different portions of the method.

Between the different phases, the particular order of the commands, signals, or any combination thereof is not critical. The corresponding identification command transmitted from the PSU 222 and received by the PSU 226 before the corresponding identification command is received by PSU 224, or vice verse. Similarly, the identification acknowledgement signal can be transmitted from the PSU 224 and received by the control module 202 before the identification acknowledgement signal is transmitted from the PSU 226 and received by the control module 202, or vice verse. In still another embodiment, the corresponding identification command can be received by the PSU 224 and the identification acknowledgement signal can be transmitted by the PSU 224 before the corresponding identification command is transmitted to or received by the PSU 226, or vice versa.

The corresponding identification command from PSU 222 to the PSUs 224 and 226 may be transmitted at nearly any phase angle. In a particular embodiment, the corresponding identification command may be transmitted at a phase angle at or near 0° or a multiple of 180°. Still, the corresponding identification command may be transmitted at other phase angles including 90°, 270°, etc. The corresponding identification command carried by the Phase A and Phase B can occur substantially simultaneously or at different times.

A time-out period between the control module transmitting the signal at block 522 of FIG. 5 and the control module receiving the corresponding identification signal(s) at block 626 of FIG. 6 can be used. The time-out period can be nearly any time, and in one embodiment is less than a minute. In another embodiment, the time-out period can be 9 seconds, 5 seconds, 2 seconds, or another suitable time. In one embodiment, the time can be less than 1 second and as short as a few milliseconds. The control module may include a timing mechanism that is part of or can be used by the grid processor. After the time-out period, the grid processor determines that any PSU that did not receive the corresponding identification command or transmit the identification acknowledgement signal back to the control module is not part of that particular power grid, is inoperable, off-line, in an initialization state, or otherwise unavailable.

The method can also include determining whether there are any further unmapped PSUs, at decision 642. Referring to FIG. 2, PSUs 242, 244, and 246 have not been mapped to a power grid (YES branch from decision 642). The method can yet further include selecting another unmapped PSU for the mapping sequence, at block 644.

The method returns to block 522 of FIG. 5, and repeats the identification sequence in blocks 522, 524, 626, 628, and decision 646 for the remainder of the PSUs that are available. For example, the control module 202 can transmit an identification initiation command to PSU 242, which in turn transmits the corresponding identification command that is carried by Phase D and Phase E that is received by PSUs 244 and 246. Depending on the availability of the PSUs 244 and 246, each of PSUs 244 and 246 can transmit an identification acknowledgement signal to the control module 202. In a particular embodiment, the grid processor within the control module may determine that PSUs 242, 244, and 246 are part of the same power grid, which is different from the power grid for PSUs 222, 224, and 226. As such, the control module 202 may not receive a corresponding identification signal from the PSUs 222, 224, and 226 when the PSU 242 is the selected PSU. At decision 642, after all PSUs have been mapped (NO branch from diamond 642), the method ends.

After reading the specification, skilled artisans appreciate that different configuration details can be used. For example, slave/master configurations can be used when performing the mapping sequence. In a particular embodiment, the selected PSU can be a master, while the other PSUs are slaves to the selected PSU 222. In another embodiment, the identification initiation command to the selected PSU 222 can also include an instruction for the selection PSU 222 to be put into a broadcast mode, and the control module 202 may also transmit signals to the other PSUs, whether on the same or different power grids, to put them into a listen mode. Note that the broadcast/listen modes and master/slave designations are optional.

After the PSUs have been mapped to the power grids, the information regarding the power grids can be used by the power distribution system, the information handling system (s), or any combination thereof. In a particular embodiment, an information handling system may have an N+N power grid redundancy policy, and thus, may need at least two PSUs on each of two different power grids (at least 4 PSUs, total). The control module of the power distribution system or the system manager of the information handling system can use the information to determine if sufficient PSUs on different power grids are available to meet the policy. In another particular embodiment, an information handling system may have an N+1 PSU redundancy policy. The control module of the power distribution system or the system manager of the information handling system can use the information to determine if sufficient PSUs are available to meet the policy.

In still other embodiment, the power grid information, including the PSU mappings can be used by the control module of the power distribution system or the system manager of the information handling system to determine, which PSUs to activate or deactivate, or if activated, how much power is to be generated by the PSUs, individually or collectively. The system power of the information handling system can receive the appropriate amount of power from the PSUs. In another embodiment, a plurality of information handling systems may be coupled to the power distribution system. The system managers of the information handling system may provide the control module of the power distribution system information or other data regarding power needed and power redundancy policies, if any. The control module of the power distribution system can process the information or other data to allow more reliable power to be provided to the information handling systems that are powered by the power distribution system.

In one embodiment, the control module can manage the power grids independently of one another. The control module can also send to a system manager information regarding validation and management of the power distribution system or other suitable information regarding the power distribution system. Also, the control module can enable the administration, modification, or both of the power grids within the power distribution system.

The concepts as described herein can be extended to other modifications. The method is not limited by the number of power grids, PSDs, PSUs, or number of external power sources. More than two external power sources can be used, and the external power sources can provide alternating current or direct current. In addition, coupling can be direct or indirect, and can include connections (e.g., connected by conductors without any intervening switches or other electronic components).

In one embodiment, the control module of the power distribution system can transmit a plurality of identification initiation commands to different PSUs simultaneously or can send a later identification initiation command to a PSU before a mapping sequence associated an earlier identification initiation command has been completed. In this particular embodiment, a predetermined order for selecting PSUs may be used. For example, identification initiation commands can be transmitted from the control module and received by the PSUs coupled to the lowest or first slots of the power distribution system (e.g., received by the PSUs 222 and 242).

The systems and methods as described herein are useful, extendible, and less prone to human error. Power supply units can be interchanged without having to worry about manually mapping PSUs or particular wiring schemes to connect to particular power grids for an information handling system. The power supplies can be plugged in or otherwise coupled to the control module and a PDU. When the system is powered on, the control module for a power distribution system can perform a method that automatically detects PSUs and maps the PSUs to their corresponding power grids.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of employing a power supply grid can include transmitting a first identification initiation command from a control module that is received by a first power supply unit to initiate a first corresponding identification command, wherein the first power supply unit has a first power supply unit identifier. The method can also include transmitting the first corresponding identification command from the first power supply unit that is received by a second power supply unit, wherein the first corresponding identification command is carried by a first power supply phase. The method can further include transmitting a first identification acknowledgement signal from the second power supply unit that is received by the control module in response to the first corresponding identification command, wherein the first identification acknowledgement signal includes a second power unit identifier for the second power supply unit.

In one embodiment of the first aspect, the method can further include transmitting the first corresponding identification command from the first power supply unit that is received by a third power supply unit, wherein the first corresponding identification command is carried by a second power supply phase. The method can still further include transmitting a second identification acknowledgement signal from the third power supply unit that is received by the control module in response to first corresponding identification command, wherein the second identification acknowledgement signal includes a third power unit identifier for the third power supply unit. In a particular embodiment, the method can further include mapping the first power supply unit, the second power supply unit, and the third power supply unit to a first power grid. In a more particular embodiment, each of the first power supply unit, the second power supply unit, and the third power supply unit can include a single phase power supply unit.

In another embodiment of the first aspect, transmitting the first corresponding identification command can include routing the first corresponding identification command through a power distribution unit. In a particular embodiment, the method can further include receiving power at the first power supply unit and the second power supply unit from an external power source via the power distribution unit.

In still another embodiment of the first aspect, the method can further include not receiving any identification acknowledgement signal from a third power supply unit. The method can still further include transmitting a second identification initiation command from the control module that is received by a third power supply unit to initiate a second corresponding identification command, wherein the third power supply unit has a third power supply unit identifier, transmitting the second corresponding identification command from the third power supply unit that is received by a fourth power supply unit, wherein the second corresponding identification command is carried by a third power supply phase, and transmitting a second identification acknowledgement signal from the fourth power supply unit that is received by the control module in response to the second corresponding identification command, wherein the second identification acknowledgement signal includes a fourth power unit identifier for the fourth power supply unit. In a particular embodiment, the method can further include mapping the first power supply unit and the second power supply unit to a first power grid, and the third power supply unit and the fourth power supply unit to a second power grid different from the first power grid. In a more particular embodiment, the method can further include detecting which power supply units are coupled to the control module and determining whether all power supply units that have been detected by the control module have been mapped.

In a second aspect, a control module can include a grid processor and a communication module. The grid processor can be operable to initiate an identification process using a particular phase of three available phases present within a power grid, and process power supply unit identifiers received over the particular phase of the three available phases. The communication module can be operable to transmit an identification initiation command to a first power supply unit for the first power supply unit to transmit a first corresponding identification command that is to be carried by a first power supply phase. The communication module can be further operable to receive a first identification acknowledgement signal from a second power supply unit, wherein the first identification acknowledgement signal includes a second power supply unit identifier.

In one embodiment of the second aspect, the grid processor can be further operable to map which power supply units are associated with a power grid in response to communications sent or received by the communication module. In a particular embodiment, the control module can further include a detection module operable to detect which power supply units are coupled to the control module, wherein the grid processor is further operable to determine if a detected power supply unit is unmapped. In another embodiment, the identification initiation command can also command the first power supply unit for the first power supply unit to transmit a second corresponding identification command that is to be carried by a second power supply phase, and the communication module can be further operable to receive a second identification acknowledgement signal from a third power supply unit, wherein the second identification acknowledgement signal includes a third power supply unit identifier. In another particular embodiment, the first power supply phase and the second power supply phase are different phases.

In a third aspect, a power distribution system can include a control module including a first communication module and a first power supply unit coupled to the control module. The first power supply unit can include a second communication module operable to receive a first command transmitted by the control module, and transmit a corresponding identification command carried by a power supply phase. The power distribution system can further include a second power supply unit coupled to the control module. The second power supply unit can include a third communication module operable to receive the corresponding identification command from the first power supply unit, and transmit an identification acknowledgement signal to the control module in response to receiving the corresponding identification command.

In one embodiment of the third aspect, the power distribution system can further include a first power distribution unit coupled to the first power supply unit and the second power supply unit, wherein the first power distribution unit is operable to allow the corresponding identification command to be routed through the first power distribution unit. In a particular embodiment, the power distribution system can further include a third power supply unit coupled to the control module, a fourth power supply unit coupled to the control module, and a second power distribution unit coupled to the third power supply unit and the fourth power supply unit. In a more particular embodiment, the first power supply unit, the second power supply unit, and the first power distribution unit are associated with a first power grid, and the third power supply unit, the fourth power supply unit, and the second power distribution unit are associated with a second power grid. In an even more particular embodiment, the power distribution system can further include an N+N configuration. In another embodiment, the power distribution system can further include an information handling system including an input power source operable to receive input power from a power grid including the first power supply and electronics operable to use the input power.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of employing a power supply grid comprising:
   transmitting a first identification initiation command from a control module that is received by a first power supply unit to initiate a first corresponding identification command, wherein the first power supply unit has a first power supply unit identifier;
   transmitting the first corresponding identification command from the first power supply unit that is received by a second power supply unit, wherein the first corresponding identification command is carried by a first power supply phase through a power distribution unit connected to both the first power supply unit and the second power supply unit; and
   transmitting a first identification acknowledgement signal from the second power supply unit that is received by the control module in response to the first corresponding identification command, wherein the first identification acknowledgement signal includes a second power unit identifier for the second power supply unit.

2. The method of claim 1, further comprising:
   transmitting the first corresponding identification command from the first power supply unit that is received by a third power supply unit, wherein the first corresponding identification command is carried by a second power supply phase; and
   transmitting a second identification acknowledgement signal from the third power supply unit that is received by the control module in response to first corresponding identification command, wherein the second identification acknowledgement signal includes a third power unit identifier for the third power supply unit.

3. The method of claim 2, further comprising mapping the first power supply unit, the second power supply unit, and the third power supply unit to a first power grid.

4. The method of claim 3, wherein each of the first power supply unit, the second power supply unit, and the third power supply unit includes a single phase power supply unit.

5. The method of claim 1, further comprising receiving power at the first power supply unit and the second power supply unit from an external power source via the power distribution unit.

6. The method of claim 1, further comprising:
   not receiving any identification acknowledgement signal from a third power supply unit;
   transmitting a second identification initiation command from the control module that is received by the third power supply unit to initiate a second corresponding identification command, wherein the third power supply unit has a third power supply unit identifier;
   transmitting the second corresponding identification command from the third power supply unit that is received by a fourth power supply unit, wherein the second corresponding identification command is carried by a second power supply phase; and
   transmitting a second identification acknowledgement signal from the fourth power supply unit that is received by the control module in response to the second corresponding identification command, wherein the second identification acknowledgement signal includes a fourth power unit identifier for the fourth power supply unit.

7. The method of claim 6, further comprising mapping the first power supply unit and the second power supply unit to a first power grid, and the third power supply unit and the fourth power supply unit to a second power grid different from the first power grid.

8. The method of claim 7, further comprising:
   detecting which power supply units are coupled to the control module; and
   determining whether all power supply units that have been detected by the control module have been mapped.

9. A control module comprising:
   a grid processor operable to:
      initiate an identification process using a particular phase of three available phases present within a power grid; and
      process power supply unit identifiers received over the particular phase of the three available phases; and
   a communication module operable to:
      transmit a identification initiation command to a first power supply unit for the first power supply unit to transmit a first corresponding identification command that is to be carried by a first power supply phase through a power distribution circuit to a second power supply unit; and
      receive a first identification acknowledgement signal from the second power supply unit, wherein the first identification acknowledgement signal includes a second power supply unit identifier.

10. The control module of claim 9, wherein the grid processor is further operable to map which power supply units are associated with a power grid in response to communications sent or received by the communication module.

11. The control module of claim 10, further comprising a detection module operable to detect which power supply units are coupled to the control module, wherein the grid processor is further operable to determine if a detected power supply unit is unmapped.

12. The control module of claim 9, wherein:
   the identification initiation command is also to command the first power supply unit for the first power supply unit to transmit a second corresponding identification command that is to be carried by a second power supply phase; and
   the communication module is further operable to receive a second identification acknowledgement signal from a third power supply unit, wherein the second identification acknowledgement signal includes a third power supply unit identifier.

13. The control module of claim 12, wherein the first power supply phase and the second power supply phase are different phases.

14. A power distribution system comprising:
a control module including a first communication module;
a first power supply unit coupled to the control module, wherein the first power supply unit includes a second communication module operable to:
   receive a first command transmitted by the control module; and
   transmit a corresponding identification command carried by a power supply phase;
a second power supply unit coupled to the control module, wherein the second power supply unit includes a third communication module operable to:
   receive the corresponding identification command from the first power supply unit; and
   transmit an identification acknowledgement signal to the control module in response to receiving the corresponding identification command; and
a first power distribution unit coupled to the first power supply unit and the second power supply unit, wherein the first power distribution unit is operable to allow the corresponding identification command to be routed through the first power distribution unit.

15. The power distribution system of claim 14, further comprising:
   a third power supply unit coupled to the control module;
   a fourth power supply unit coupled to the control module; and
   a second power distribution unit coupled to the third power supply unit and the fourth power supply unit.

16. The power distribution system of claim 15, wherein:
the first power supply unit, the second power supply unit, and the first power distribution unit are associated with a first power grid; and
the third power supply unit, the fourth power supply unit, and the second power distribution unit are associated with a second power grid.

17. The power distribution system of claim 16, further comprising an N+N configuration.

18. The power distribution system of claim 14, further comprising an information handling system including:
   an input power source operable to receive input power from a power grid including the first power supply; and
   electronics operable to use the input power.

* * * * *